United States Patent [19]

Yoshizawa

[11] Patent Number: 5,631,774
[45] Date of Patent: May 20, 1997

[54] POLARIZING BEAM SPLITTER AND OPTICAL PICK-UP HEAD COMPRISING THE SAME

[75] Inventor: Akihiko Yoshizawa, Kanagawa, Japan

[73] Assignee: Olympus Optical Co., Ltd., Tokyo, Japan

[21] Appl. No.: 428,487

[22] Filed: Apr. 27, 1995

[30] Foreign Application Priority Data

Apr. 28, 1994 [JP] Japan .................................... 6-092030

[51] Int. Cl.[6] .............................. G02B 27/12; G11B 7/00
[52] U.S. Cl. ............................ 359/640; 359/639; 369/110
[58] Field of Search ................................. 359/640, 639,
359/495, 496; 369/44.14, 272, 273, 288,
110; 356/351, 352

[56] References Cited

U.S. PATENT DOCUMENTS

| | | | |
|---|---|---|---|
| 4,812,637 | 3/1989 | Taki | 250/201 |
| 5,085,496 | 2/1992 | Yoshida | 359/569 |
| 5,223,975 | 6/1993 | Naganuma | 359/487 |
| 5,329,397 | 7/1994 | Chang | 359/308 |
| 5,387,991 | 2/1995 | Mitsutake | 359/93 |
| 5,422,866 | 6/1995 | Yamaguchi | 369/13 |
| 5,426,626 | 6/1995 | Katayama | 369/44.41 |
| 5,541,906 | 7/1996 | Kobayashi | 369/112 |

FOREIGN PATENT DOCUMENTS 5-203810A  8/1993  Japan .

*Primary Examiner*—Georgia Y. Epps
*Assistant Examiner*—Ricky Mack
*Attorney, Agent, or Firm*—Watson Cole Stevens Davis, P.L.L.C.

[57] ABSTRACT

A polarizing beam splitter for dividing a return light beam reflected by a magneto-optical record medium into two light beams polarized in mutually orthogonal directions, including a main body made of a birefringent crystal and having an incident surface upon which the return light beam is made incident and a reflection surface, and a reflecting member provided on the reflection surface of the main body and formed by a metal film or a stack of dielectric material films. Upon refraction by the incident surface of the main body, the incident light beam is split into ordinary and extraordinary light beams, which are then reflected by the reflection surface of the main body. An optic axis of the main body is set to be parallel with the reflection surface, the ordinary and extraordinary light beams are reflected as they are and emanate from the polarizing beam splitter.

14 Claims, 12 Drawing Sheets

FIG_3
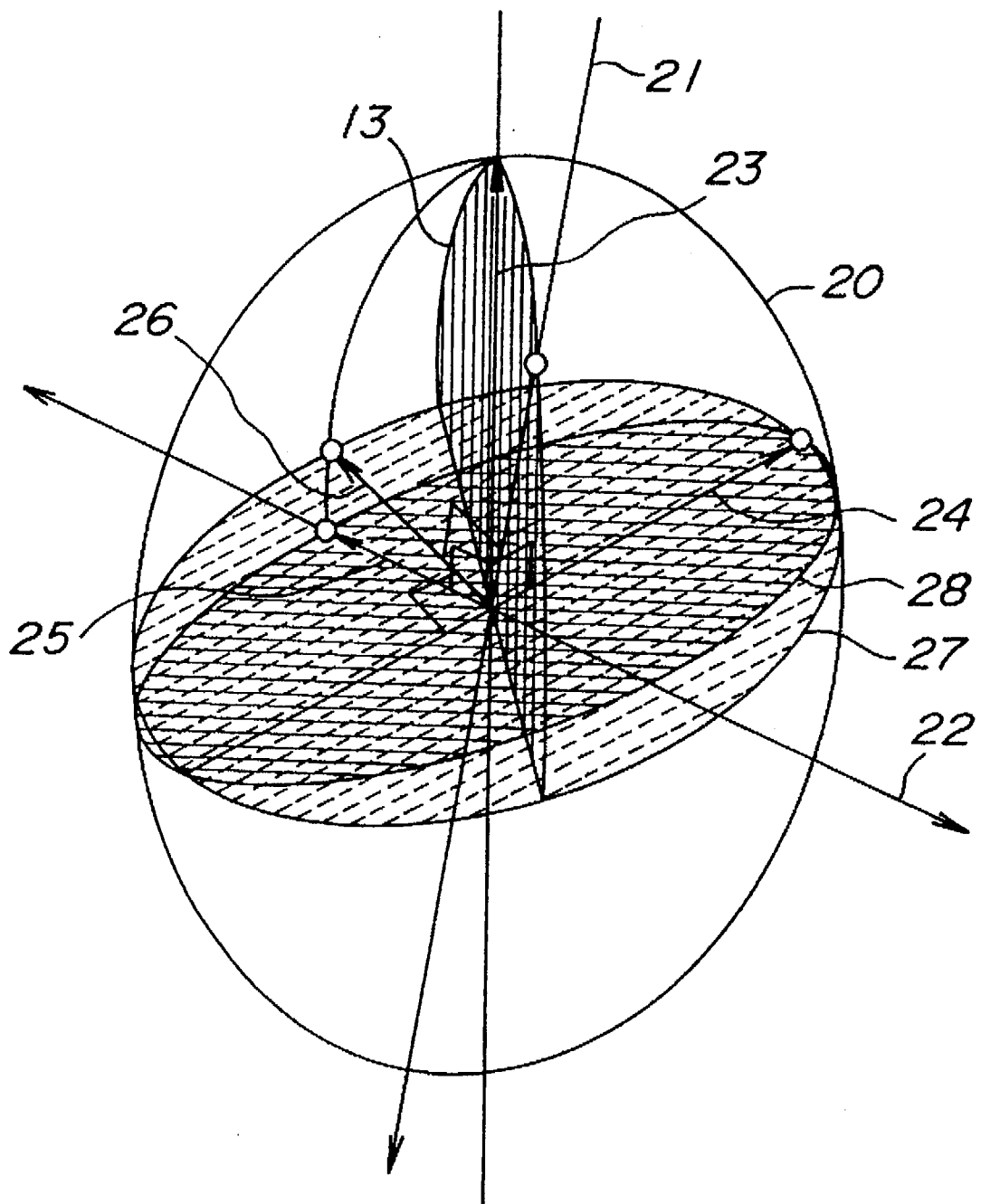

FIG_4
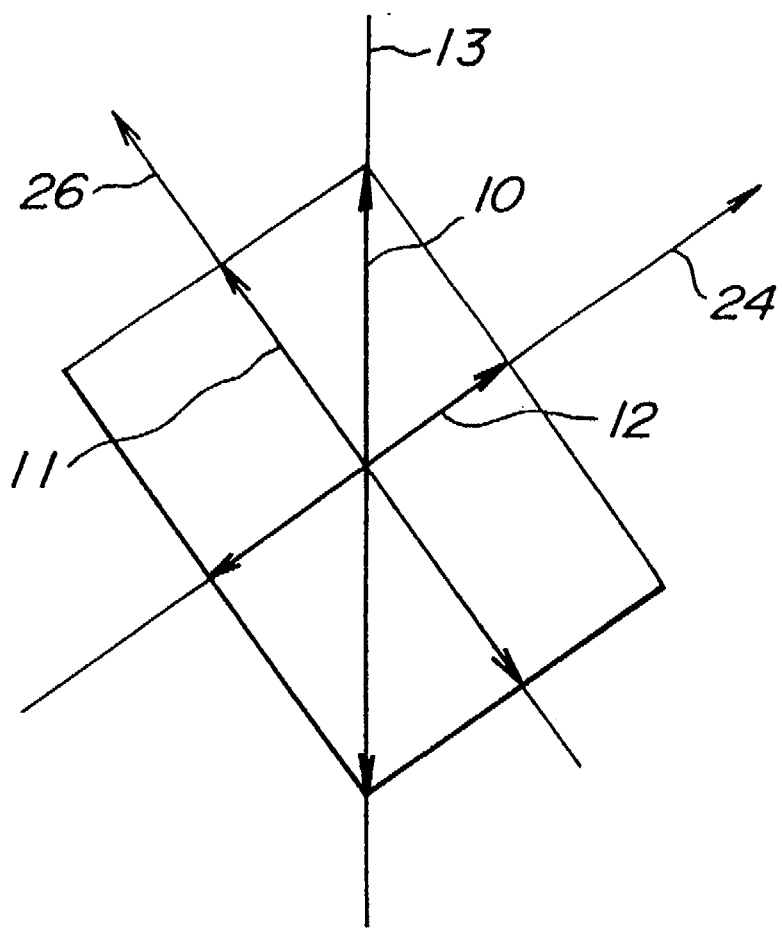

FIG_7A
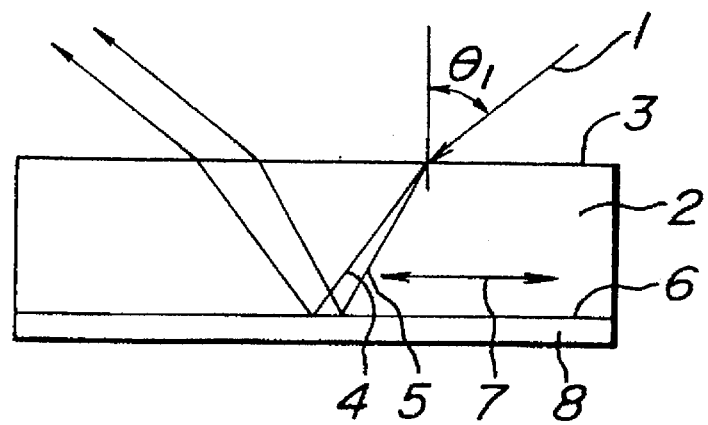
FIG_7B
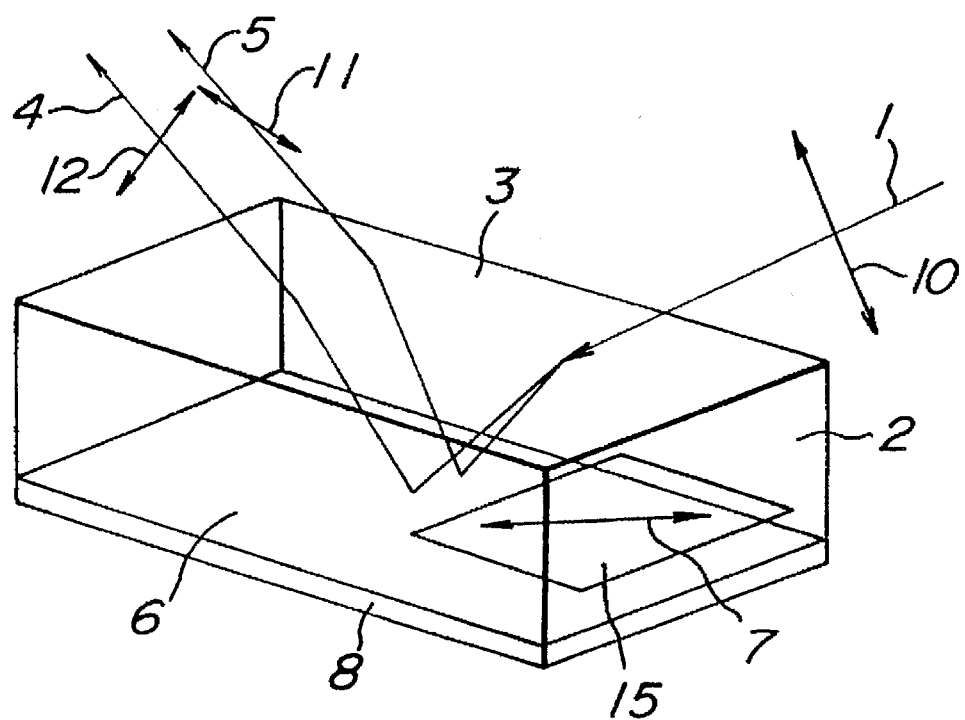

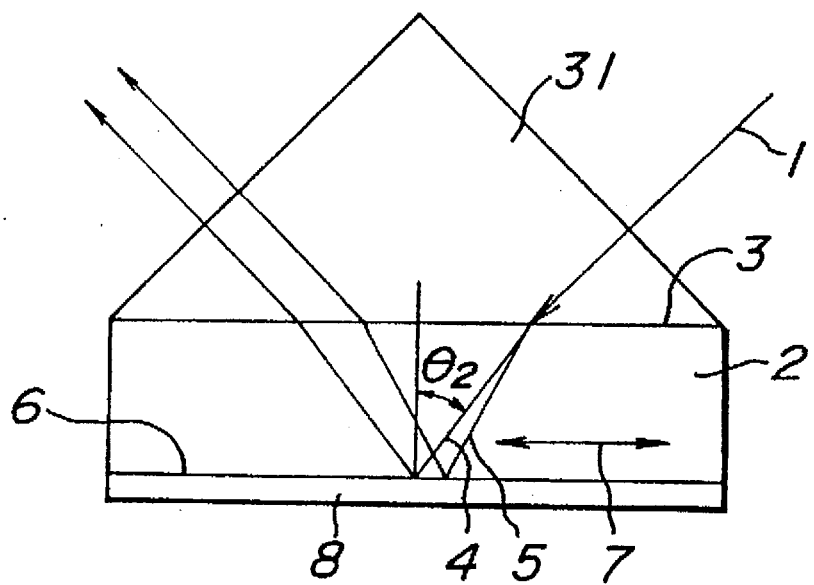
FIG_8

FIG_9
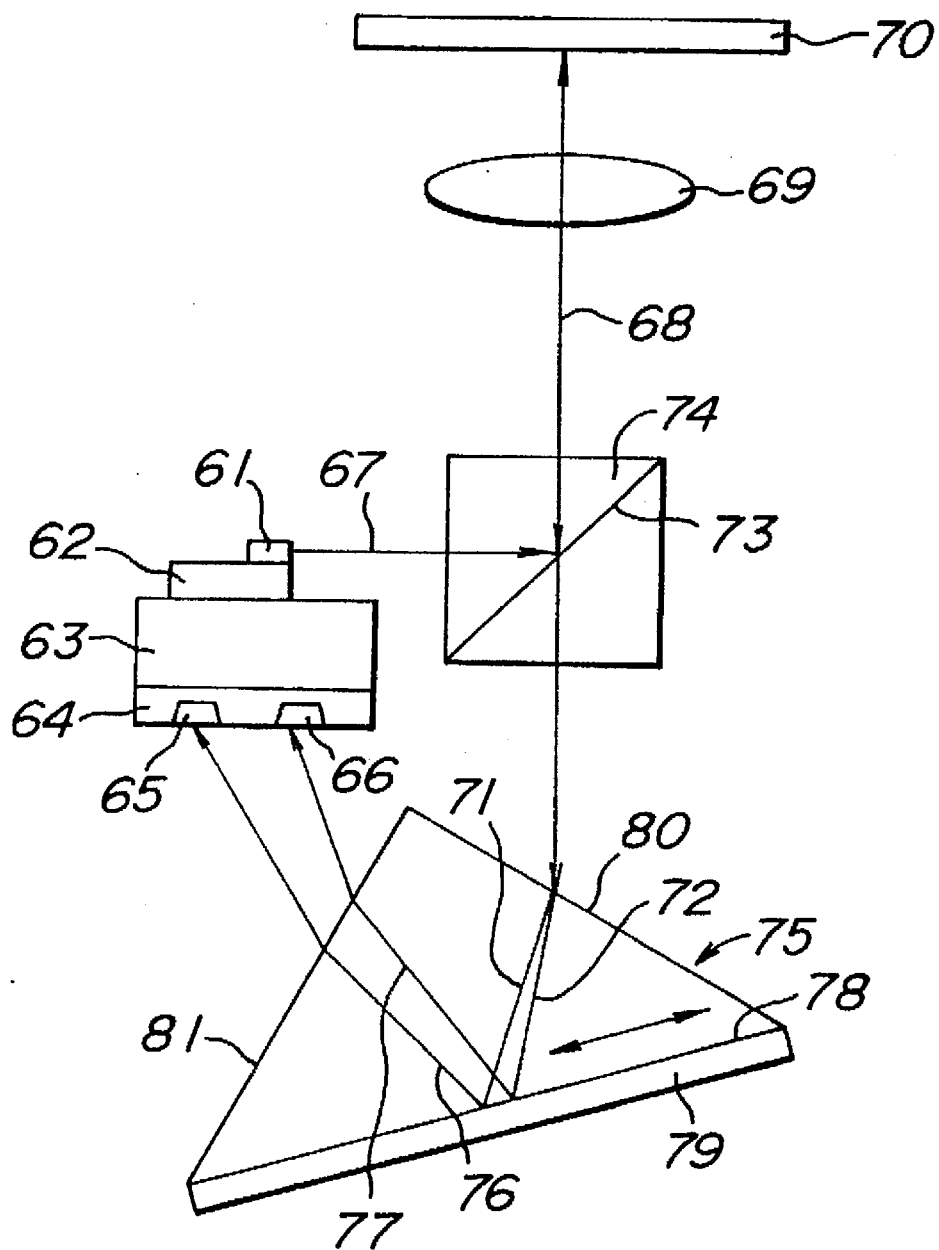

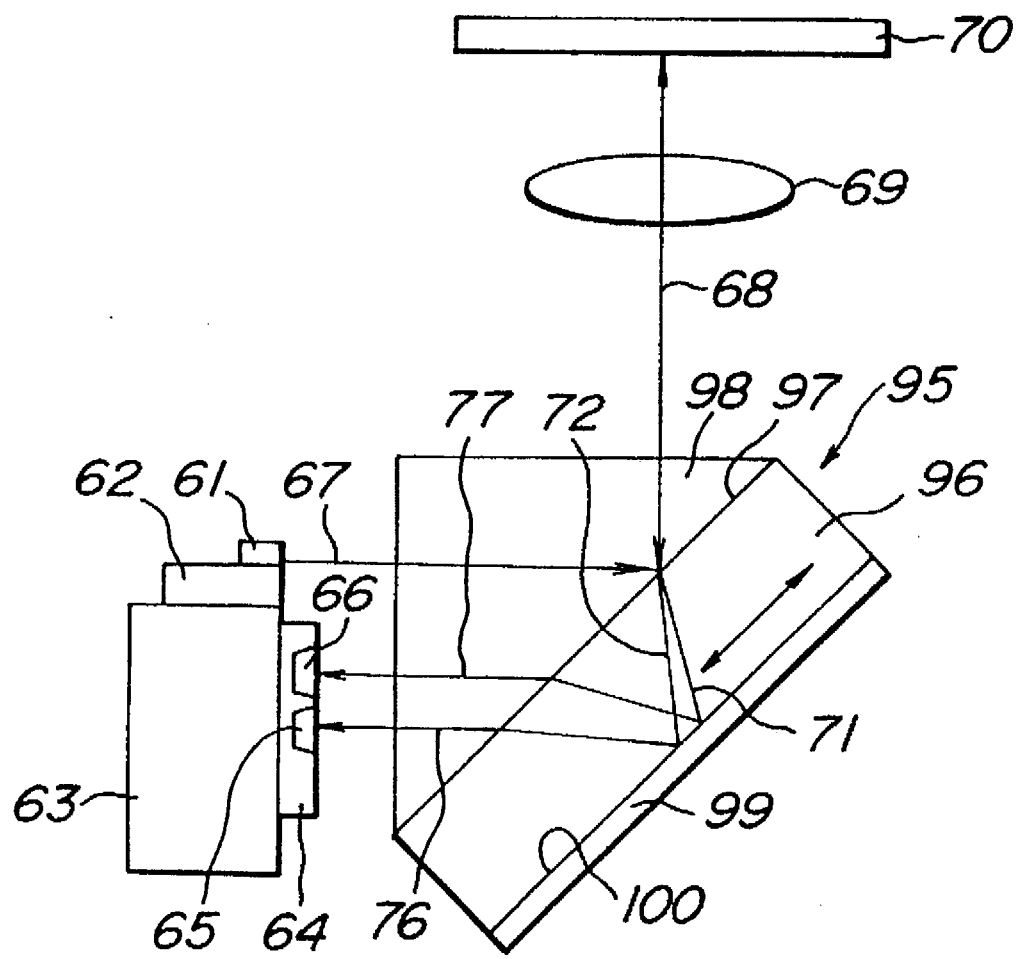
FIG_11

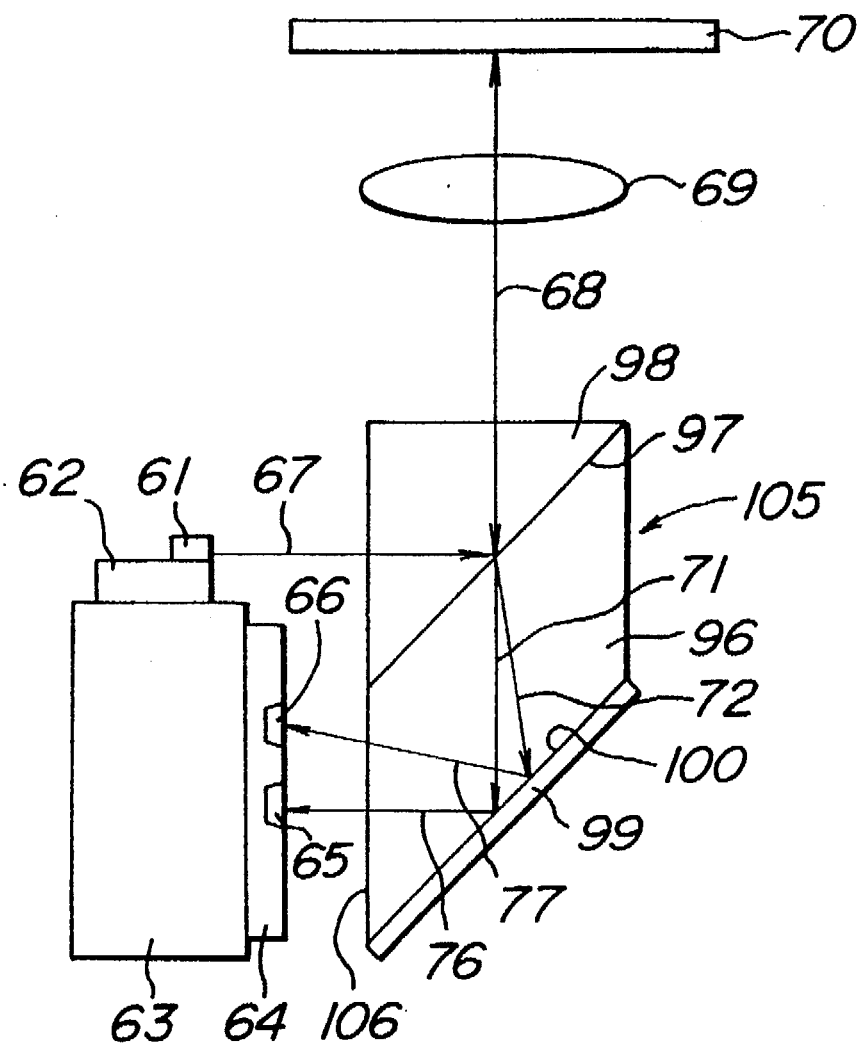
FIG_12

POLARIZING BEAM SPLITTER AND OPTICAL PICK-UP HEAD COMPRISING THE SAME

BACKGROUND OF THE INVENTION

1. Field of the Invention

The present invention relates to a polarizing beam splitter for splitting an incident light beam into two light beams which are polarized in mutually orthogonal directions, and an optical pick-up head comprising a polarizing beam splitter for recording and/or reproducing information on and/or from a magneto-optical record medium.

2. Related Art Statement

There have been proposed various polarizing beam splitters such as Nicol's prism and Glan-Thompson's prism for dividing an incident light beam into two orthogonally polarized light beams. In these polarizing beam splitters, the two orthogonally polarized light beams are derived by means of a single refraction or a combination of a single refraction and a single reflection. Further, there has been proposed a Cotton prism in which an incident light beam is divided into two orthogonally polarized light beams by means of a single reflection.

FIG. 1 is a schematic view showing a known Cotton prism. A prism 100 is consisting of a triangular prism made of a birefringent crystal whose optic axis A is coincided with an optical axis of an incident light beam I. The prism 100 is arranged with respect to the incident light beam I such that the incident light beam transmitted through an incidence surface 102 of the prism is made incident upon a reflection surface 101 of the prism at an incident angle of 45 degrees. Therefore, an optical axis of the light beam reflected by the reflection surface 101 becomes perpendicular to the optic axis A of the prism. Upon the reflection by the reflection surface 101, the incident light beam I is divided into two light beams, i.e. ordinary light beam $O_1$ and extraordinary light beam $O_2$. The prism 100 has different indices of refraction for the ordinary light beam $O_1$ and extraordinary light beam $O_2$, so that these beams are reflected into different directions and enamate from an exit surface 103 of the prism 100.

In the Cotton prism 100, the incidence light beam I should have a polarized component which is in a plane of incidence (P polarized component) and a polarized component which is perpendicular to the plane of incident (S polarized component). It should be noted that the plane of incidence is defined as a plane which includes the optical axis of the incident light beam and a normal to the reflection surface 101. When the incident light beam I includes these P and S polarized components, the P and S components are divided into the extraordinary light beam $O_2$ and ordinary light beam $O_1$, respectively. Therefore, when the incident light beam contains only the P polarized component or S polarized component, the incident light beam could not be split into two light beams. This often limits the application of the Cotton prism.

In Japanese Patent Application Laid-open Publication Kokai Hei 5-203810, there has been proposed a polarizing beam splitter which can avoid the above mentioned drawback. FIGS. 2A and 2B illustrate a construction of this known polarizing beam splitter. The polarizing beams splitter comprises a composite prism 110 including an azimuth rotator 111 and a birefringent crystal prism 112. An optic axis A of the birefringent crystal prism 112 is set to be substantially perpendicular to an optical axis of an incident light beam I and to be substantially parallel with optical axes of exiting light beams $O_1$ and $O_2$. The azimuth rotator 111 serves to rotate a polarizing direction of the incident light beam I, i.e. P polarized light beam by such an angle that a polarizing direction of the incident light beam impinging upon the birefringent crystal prism 112 is inclined by, for instance 45 degrees with respect to the optic axis A of the birefringent crystal. Therefore, both P and S polarized light components are made incident upon a reflection surface 113 of the birefringent crystal prism 112. Therefore, upon reflection at the reflection surface 13, the incident light beam is divided into two orthogonally polarized light beams, i.e. ordinary light beam $O_1$ and extraordinary light beam $O_2$. In this manner, this known polarizing beam splitter can divide the P polarized light beam I into the orthogonally polarized light beams $O_1$ and $O_2$.

In the known polarizing beam splitter shown in FIGS. 2A and 2B, the beam splitter is formed by cementing the azimuth rotator 111 and birefringent crystal prims 112 to each other, so that a manufacturing cost is liable to be increased. Moreover, it is required to align the optic axes of the azimuth rotator 111 and birefringent crystal prims 112 with each other, so that an adjustment is very cumbersome.

SUMMARY OF THE INVENTION

The present invention has for its object to provide a novel and useful polarizing beam splitter and an optical pick-up head, in which the above mentioned problems of the known polarizing beam splitter and optical pick-up head can be mitigated, and which can be manufactured at a low cost without requiring a cumbersome adjustment.

According to the invention, a polarizing beam splitter comprises:

a main body made of a birefringent crystal and having an incident surface upon which an incident light beam is made incident and by which the incident light beam is refracted and a reflection surface which reflects the incident light beam transmitted through said incident surface, an optic axis of the birefringent crystal being on a plane which is parallel with said reflection surface; and a reflecting member provided on said reflection surface of the main body and being made of a metal or dielectric materials.

According to the invention, an optical pick-up head for recording and/or reading information on and/or from a magneto-optical record medium comprises:

a light source emitting a linearly polarized light beam;

an objective lens for projecting said light beam onto a magneto-optical record medium;

a photodetector for receiving a return light beam reflected by the magneto-optical record medium and converged by said objective lens; and a polarizing beam splitter arranged between said objective lens and said photodetector and including a main body made of a birefringent crystal and having an incident surface upon which the return light beam is made incident and by which the return light beam is refracted and a reflection surface which reflects the return light beam transmitted through said incident surface, an optic axis of the birefringent crystal being on a plane which is parallel with said reflection surface, and a reflecting member provided on said reflection surface of the main body and being made of a metal or dielectric materials; whereby an information signal and an error signal representing a positional error of the objective lens with respect to the magneto-optical record medium are derived by processing output signals from the photodetector.

According to the invention, said main body made of a birefringent crystal may be preferably formed as a triangular prism or a plane parallel plate. Particularly, the plane parallel plate is preferable, because it can be easily manufactured at a low cost.

In a preferable embodiment of the polarizing beam splitter according to the invention, a prism made of a material whose refractive index is lower than that of the birefringent crystal is cemented onto the incident surface of the main body. In this case, an angle between the incident light beam and the two split light beams can be made large, because both of a function of bending the light beam and a function of splitting the light beam can be attained simultaneously.

The incident light beam is refracted by the incident surface of the main body and is divided into ordinary light beam and extraordinary light beam. Then, these light beams are made incident upon the reflection surface. According to the invention, the optic axis of the main body made of a birefringent crystal is set on a plane which is parallel with the reflection surface of the main body, and therefore a direction of the optic axis projected onto an elliptical cross section of an optical indicatrix perpendicular to the incident ordinary light beam and a direction of the optic axis projected onto an elliptical cross section perpendicular to the reflected ordinary light beam become a relation of a mirror image with respect to a plane of incidence, i.e. a plane which includes the incident ordinary light beam and a normal to the reflection surface. Similarly, a direction of the optic axis projected onto an elliptical cross section of an optical indicatrix perpendicular to the incident extraordinary light beam and direction of the optic axis projected onto an elliptical cross section perpendicular to the reflected extraordinary light beam become also a relation of a mirror image with respect to a plane of incidence including the incident extraordinary light beam and the normal to the reflection surface. Moreover, according to the invention, the reflection member consisting of a metal film or dielectric material films is applied on the reflection surface, and thus a phase difference between P polarized light and S polarized light which are generated by a reflection of the ordinary light beam and extraordinary light beam becomes substantially 180 degrees. Therefore, the ordinary light beam and extraordinary light beam are reflected by the reflection surface as they are. In the other words, the ordinary and extraordinary light beams do not produce extraordinary and ordinary light beams, respectively. In this manner, the polarizing beam splitter according to the invention can perform both the function of bending the optical path of the incident light beam polarized in any direction and the function of splitting the incident light beam into the two orthogonally polarized light beams.

Now a principle of the present invention will be explained further in detail.

A birefringent crystal can be classified into a uniaxial crystal and a biaxial crystal. Now a manner of propagating a light beam within a uniaxial crystal will be explained. FIG. 3 illustrates an optical indicatrix 20 of a negative uniaxial crystal having a refractive index for ordinary light no lower than a refractive index for extraordinary light $n_e$. Principal indices of refraction of the optical indicatrix 20 are denoted by n1 (23), n2 (24) and n3 (25) which are mutually orthogonal principal axes of the optical indicatrix 20.

In the uniaxial crystal, two principal indices of refraction among the three indices of refraction are identical with each other. In FIG. 3, n1 is equal to n2, and n3 is smaller than n1 and n2. In this case, n1 and n2 correspond to the index of refraction for the ordinary light and n3 corresponds to a smallest value of the index of refraction for the extraordinary light. The index of refraction for the extraordinary light is changed between n1 and n3 in accordance with an incident direction of an incident light beam. When the optical indicatrix 20 is cut along a plane including the principal indices of refraction 24 and 25, a cross section 28 has an elliptical shape. and a direction of the optic axis is coincided with a direction of the principal index of refraction 25.

When a light beam 21 is made incident upon the crystal, a cross section 27 perpendicular to the incident light beam 21 has an elliptical shape. Major and minor axes of the elliptical cross section 27 correspond to vibrating directions of two light beams which are split within the crystal. These two light beams oscillating in the mutually orthogonal directions are denoted by reference numerals 24 and 26. The light beam 24 is ordinary light and the light beam 25 is extraordinary light. The ordinary light 24 and extraordinary light 25 on the cross section 27 are illustrated in FIG. 4.

In FIG. 4, the incident light beam has a vibrating component 10 which is parallel with a plane of incidence 13 and is divided into ordinary light 12 and extraordinary light 11, and magnitudes of the the ordinary light and extraordinary light correspond to amplitudes or amounts of ordinary light and extraordinary light. A direction in which the extraordinary light propagates within the crystal generally differs from a direction in which the ordinary light propagates, and could be determined by the light-velocity ellipsoids and the incident direction.

By utilizing the above mentioned principle, the incident light beam can be split into two light beams which are polarized in mutually orthogonal directions. In the known Cotton prism illustrated in FIG. 1, the optic axis is in the plane of incidence and the direction of the optic axis is coincided with the incident direction of the incident light beam. In this case, a cross section of the optical indicatrix perpendicular to the incident light beam is a circular, so that there exists only ordinary light and the incident light beam is not divided into two light beams polarized in mutually orthogonal directions. However, when the incident light beam is reflected, a relative direction of the optic axis is changed and thus a cross section becomes elliptical. Therefore, there is generated the extraordinary light component, and thus the incident light beam is divided into the two light beams polarized in mutually orthogonal directions.

When the incident direction of the incident light beam is not coincided with the optic axis of the birefringent crystal, the incident light beam is divided into two light beams having different vibrating directions and propagating directions. Then, upon the reflection of these two light beams, each of the light beams produces two reflected light beams. Therefore, there are produced four light beams.

According to the present invention, the optic axis of the birefringent crystal is set to be on a plane which is parallel with the reflection surface, and therefore directions of the optic axis with respect to the light beams become a mirror image relationship with respect to the respective planes of incidence. On the other hand, the ordinary light and extraordinary light produced within the crystal are not reflected as they are, but there is introduced a phase difference between the P polarized component and the S polarized component like as the usual reflection as well as the total reflection. Therefore, the ordinary light and extraordinary light are changed from the linear polarization into an elliptical polarization. However, within the crystal, there can be existent only the ordinary light and extraordinary light.

Now it is assumed that upon the reflection of the ordinary light, there is produced only the ordinary light. This condition can be satisfied if conditions of polarization before and after the reflection become a mirror image relation with respect to the plane of incidence like as the optic axis. Therefore, it is sufficient that a phase difference between P polarized light and S polarized light is 180 degrees. This can be equally applied to the extraordinary light.

In the present invention, a phase difference between P polarized light and S polarized light can be 180 degrees by providing the reflecting member consisting of a metal film or dielectric material films on the reflection surface of the prism. When the reflecting member is consisting of a metal film such as gold, silver and aluminum film, a phase difference between P polarized light and S polarized light could not be completely 180 degrees, so that the ordinary light produces not only ordinary light but also extraordinary light, and similarly the extraordinary light produces not only extraordinary light but also ordinary light. However, amounts of the extraordinary light produced by the reflection of the ordinary light and the ordinary light produced by the reflection of the extraordinary light are very small, so that they can be practically neglected. When the reflecting member is consisting of a stack of plural films of dielectric materials, a phase difference between P polarized light and S polarized light can be set accurately to 180 degrees by controlling thicknesses of dielectric material films.

According to the invention, the polarizing beam splitter can be manufactured easily at a low cost and both of the light path bending function and the beam splitting function can be simultaneously attained.

BRIEF DESCRIPTION OF THE DRAWINGS

FIG. 3 is a schematic view of the optical indicatrix of a uniaxial birefringent crystal;

FIG. 4 is a schematic view explaining orthogonally polarized components divided by the uniaxial birefringent crystal;

FIGS. 7A and 7B are schematic views depicting a second embodiment of the polarizing beam splitter according to the invention;

FIG. 8 is a schematic view illustrating a third embodiment of the polarizing beam splitter according to the invention;

FIG. 9 is a schematic view representing a first embodiment of the optical pick-up head according to the invention including a fourth embodiment of the polarizing beam splitter according to the invention;

FIG. 11 is a schematic view depicting a third embodiment of the optical pick-up head according to the invention comprising a sixth embodiment of the polarizing beam splitter according to the invention; and FIG. 12 is a schematic view illustrating a fourth embodiment of the optical pick-up head according to the invention including a seventh embodiment of the polarizing beam splitter according to the invention.

DESCRIPTION OF THE PREFERRED EMBODIMENTS

Figure 1:
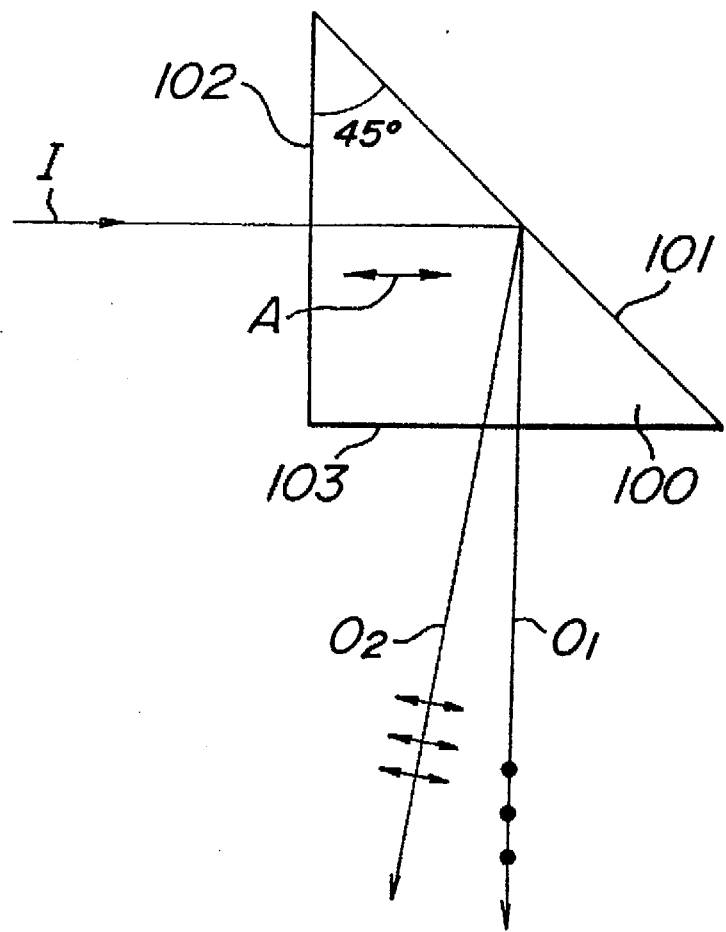
FIG. 1 is a schematic view of a known Cotton prism.
Figure 2B:
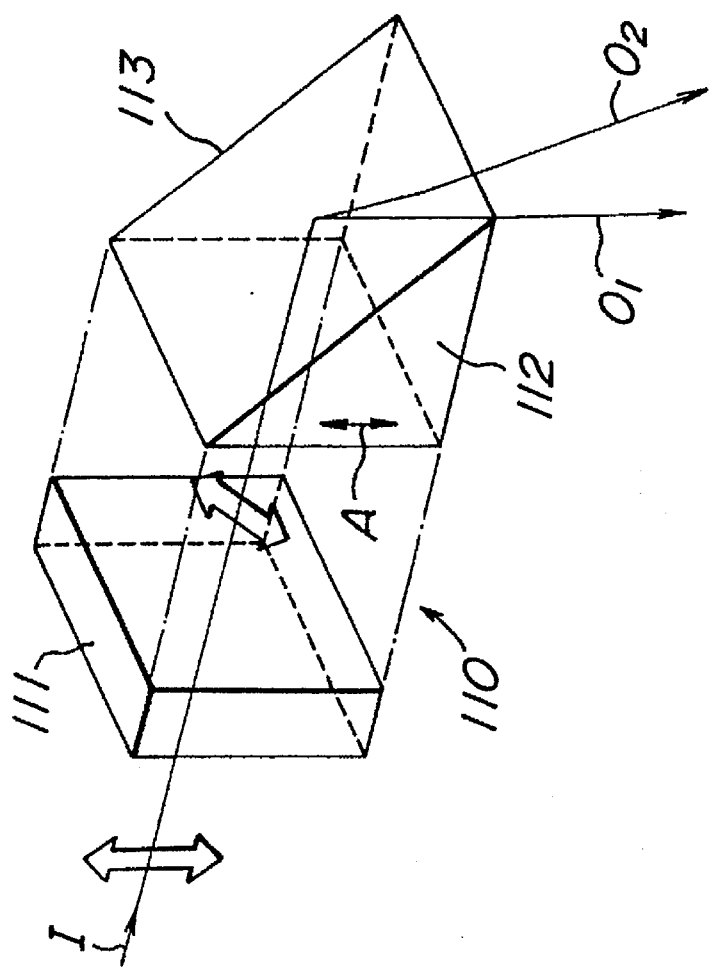
FIGS. 2A and 2B are schematic views illustrating a known polarizing beam splitter.
Figure 2A:
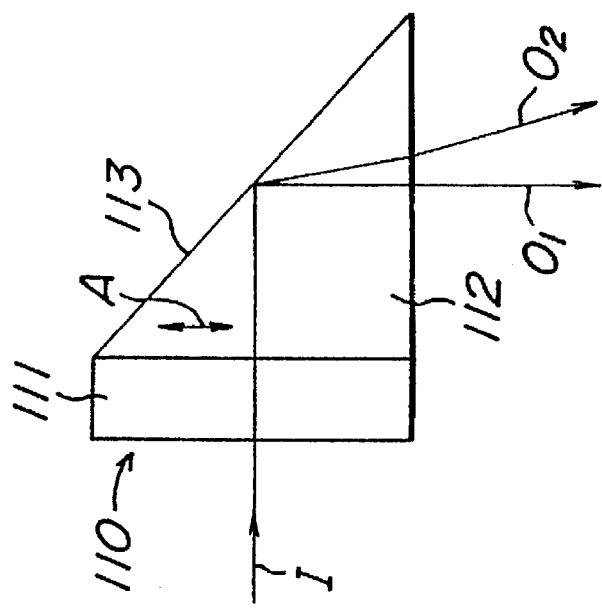
Figure 5A:
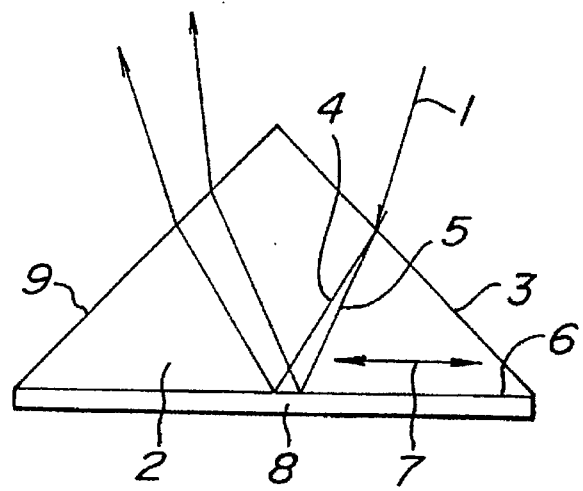
FIGS. 5A and 5B are schematic views showing a first embodiment of the polarizing beam splitter according to the invention.
Figure 5B:
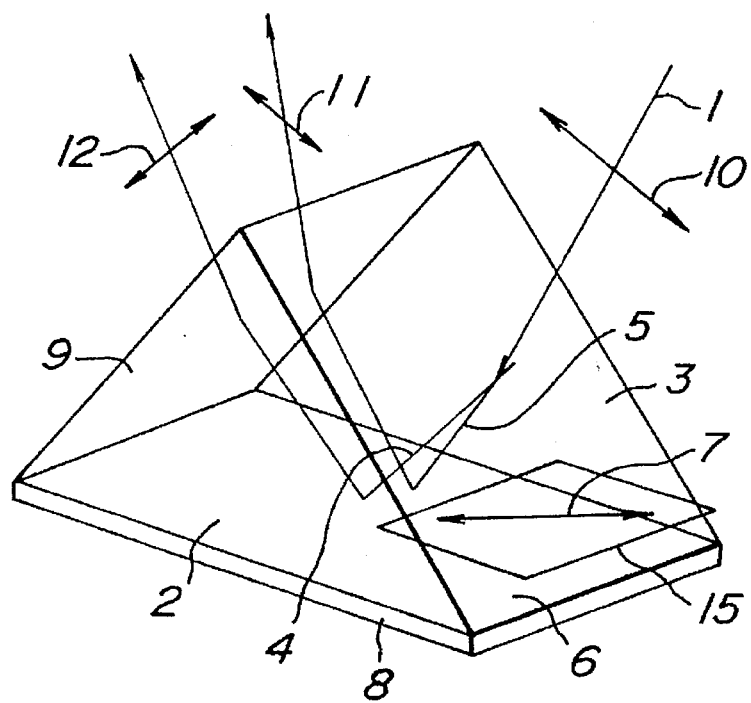
Figure 6:
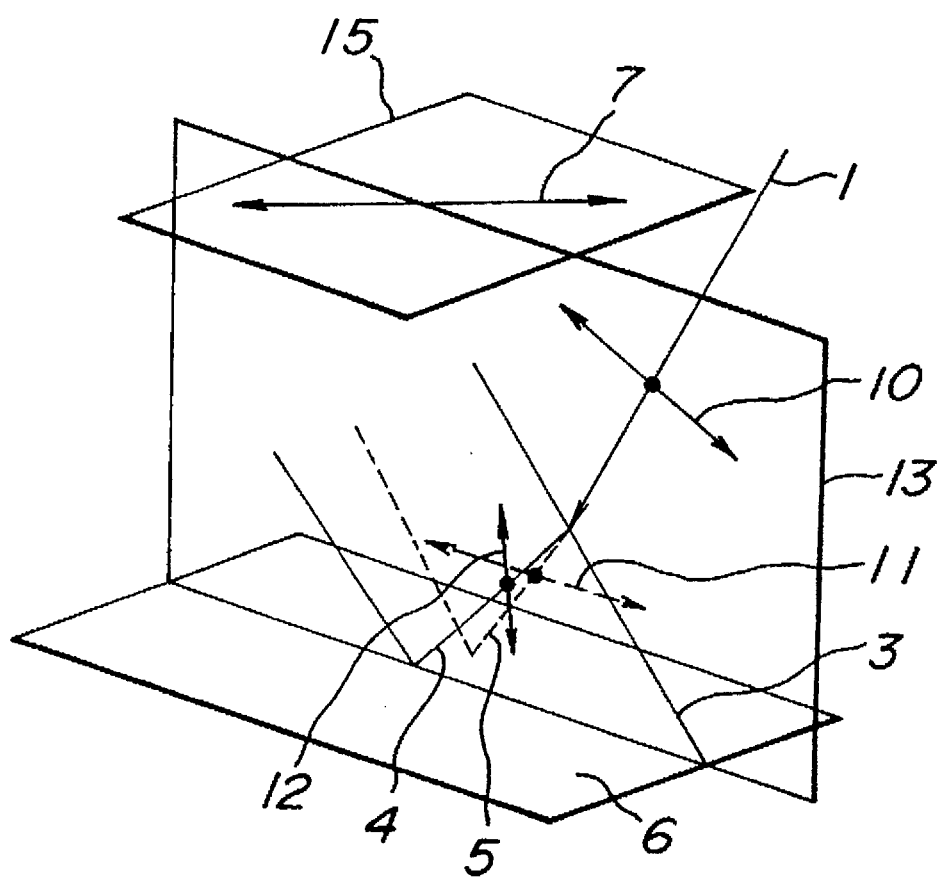
FIG. 6 is a schematic view explaining the function of the beam splitter shown in FIG. 5.

FIGS. 5A and 5B are schematic views showing a first embodiment of the polarizing beam splitter according to the invention. The polarizing beam splitter comprises a main body 2 made of a birefringent crystal. The main body 2 includes an incident surface 3 upon which a light beam 1 is made incident, a reflection surface 6 which reflects light beams refracted by the incident surface 3, and an exit surface 9 from which light beams polarized in mutually orthogonally directions emanate. An optic axis 7 of the birefringent crystal is set to be parallel with the reflection surface 6 and is inclined by 45 degrees with respect to a plane of incidence 13 (see FIG. 6) for the reflection surface 6. In the present embodiment, the main body 2 is formed by a triangular prism made of $LiNbO_3$ crystal (referred to LN crystal). A gold (Au) film 8 having a thickness of 0.5 μm is applied by a vacuum evaporation on the reflection surface 6, i.e. an outer surface of the prism constituting the reflection surface 6.

In the present embodiment, when the incident light beam 1 is made incident upon the incident surface 3 of the LN crystal prism 2, the polarizing direction of the incident light being on the plane of incidence 13 defined for the reflection surface 6, the incident light is divided into an ordinary light beam 4 and an extraordinary light beam 5. A vibrating component 10 of the incident light beam 1 is divided into an ordinary light component 12 and an extraordinary light component 11. The ordinary light beam 4 propagates on the plane of incidence 13, but the extraordinary light beam 5 deflects from the plane of incidence 13. Then, the ordinary light beam 4 and extraordinary light beam 5 are made incident upon the reflection surface 6 and are reflected thereby. As stated above, the optic axis of the main body 2 is set to be parallel with the reflection surface 6, and on the reflection surface 6, there is applied the Au film 8 having a thickness of 0.5 μm, so that a phase difference between P polarized light and S polarized light becomes 180 degrees. Therefore, the ordinary light beam 4 is reflected by the reflection surface 6 as ordinary light and similarly the extraordinary light beam 5 is reflected as extraordinary light. Finally, the thus reflected ordinary light beam 4 and extraordinary light beam 5 emanate from the exit surface 9 of the LN crystal prism 2.

In the present embodiment, the propagating direction of the incident light beam 1 can be bent and at the same time the incident light beam 1 can be split into two orthogonally polarized light beams although the polarizing direction of the incident light beam is on the plane of incidence 13. As stated above, the known Cotton prism can also perform these two functions, but in this case the vibrating direction of the incident light beam has to be inclined with respect to the plane of incidence 13. According to the invention, although the vibrating direction of the incident light beam is on the plane of incidence 13, it is possible to divide the incident light beam into two orthogonally polarized light beams as long as the vibrating direction of the incident light beam is not coincided with the optic axis 7 or is not perpendicular to the optic axis 7.

In the present embodiment, it is possible to perform both of the light path bending function and the beam splitting function without using the azimuth rotator, so that the polarizing beam splitter can be simple in construction and cheap in cost.

FIGS. 7A and 7B are schematic front and perspective views, respectively illustrating a second embodiment of the polarizing beam splitter according to the invention. In the present embodiment, a main body 2 is formed by a plane parallel plate made of LN crystal. The remaining construction of the present embodiment is identical with that of the first embodiment.

Also in the present embodiment, when an incident light beam 1 is made incident upon a surface 3 of the plane parallel plate 2, the incident light beam is divided into ordinary light beam 4 and extraordinary light beam 5. Then, these ordinary and extraordinary light beams 4 and 5 are made incident upon a reflection surface 6 of the plane parallel plate 2. An optic axis 7 of the LN crystal constituting the main body 2 is set on a plane 15 which is parallel with the reflection surface 6 and a metal film 8 is applied on the reflection surface 6, and therefore the ordinary and extraordinary light beams 4 and 5 are reflected by the reflection surface 6 as they are. In this manner, the ordinary light beam 4 and extraordinary light beam 5 reflected by the reflection surface 6 propagate within the LN crystal 2 and emanate from the surface 3. Therefore, in the present embodiment, the surface 3 of the plane parallel plate 2 made of LN crystal serves as both of the incident surface and the exit surface.

In the second embodiment, not only the same advantages as those of the first embodiment can be attained but also a special advantage that the plane parallel plate 2 can be manufactured easily at a lower cost can be obtained.

FIG. 8 is a schematic view depicting a third embodiment of the polarizing beam splitter according to the invention. In the present embodiment, on the surface 3 of the plane parallel plate 2 made of LN crystal, there is cemented a triangular glass prism 31. The incident light beam 1 is made incident upon an incident surface of the prism 31 and is then made incident upon the surface 3 of the plane parallel plate 2. The ordinary and extraordinary light beams 4 and 5 reflected by the reflection surface 6 emanate from an exit surface of the prism 31. The remaining construction of the present embodiment is identical with that of the second embodiment.

In the present embodiment, an incident angle $\theta_2$ of the ordinary light beam 4 or the extraordinary light beam 5 with respect to the reflection surface 6 can be reduced due to a difference in an index of refraction between the LN crystal of the plane parallel plate 2 and the glass prism 31. For instance, an angle between the incident light beam and the exit light beam is to be 90 degrees, in the first embodiment, an incident angle with respect to the reflection surface 6 has to be set to 45 degrees. Therefore, if an incident angle is increased, a phase difference between P polarized light and S polarized light deviates greatly from 180 degrees, and thus an amount of the extraordinary light component due to the reflection of the ordinary light beam as well as an amount of the ordinary light component due to the reflection of the extraordinary light beam are increased when the reflecting member 8 is formed by a metal film. Therefore, the incident light beam is divided into four light beams.

In the present embodiment, an index of refraction of the glass prism 31 is lower than that of the LN crystal of the plane parallel plate 2, the incident angle $\theta_2$ with respect to the reflection surface 6 can be small even if an angle between the incident light beam 1 and the exit light beams 4 and 5 is large. Therefore, the phase difference does not deviate from 180 degrees largely, and the ordinary light beam and extraordinary light beam are reflected by the reflection surface 6 as they are. In this manner, it is possible to divide the incident light beam 1 into the two light beams 4 and 5 polarized in mutually orthogonal directions.

It should be noted that also in the second embodiment, the incident angle with respect to the reflection surface can be made small, but in this case the incident angle $\theta_1$ of the ordinary light beam or the extraordinary light beam 5 with respect to the incident surface 3 in the second embodiment has to be made large. Therefore, an amount of light component which is reflected by the incident surface 3 and is not made incident upon the reflection surface 6 is increased. The light component reflected by the incident surface 3 becomes stray light and might be included in the divided light beams 4 and 5 emanating from the surface 3. In order to decrease an amount of the light component reflected by the incident surface 3 in the second embodiment, it is necessary to provide an anti-reflection member consisting of a stack of dielectric material films. In the third embodiment, an incident angle with respect to the glass prism 31 can be made sufficiently small, and thus it is possible to reduce an amount of light reflected by the incident surface of the prism 31 without providing the anti-reflection member. Moreover, a light component reflected by the incident surface of the prism 31 propagates in a direction opposite to a direction toward a direction in which the divided light beams 4 and 5 emanating from the exit surface of the prism 31 propagate, and thus the reflected light component is scarcely combined with the divided light beams.

In this manner, in the present embodiment, both of the optical path bending function and the light dividing function can be attained simultaneously by means of the simple construction using the metal film as the reflecting member 8. It should be noted that in the present embodiment, the glass prism made of a glass having an index of refraction lower than that of LN crystal, but according to the invention, the prism may be made of any optical material having an index of refraction lower than that of LN crystal.

FIG. 9 is a schematic view illustrating a first embodiment of the optical pick-up head according to the invention comprising a fourth embodiment of the polarizing beam splitter according to the invention. In the present embodiment, a polarizing beam splitter 75 having the same construction as the first embodiment is used in the optical pick-up head for an magneto-optical record medium. A linearly polarized laser beam 67 emitted by a laser diode (LD) 61 is made incident upon a glass prism 74 constituting a beam splitter, and is reflected by a cementing plane 73 of the beam splitter. Then, the laser beam emanating from the beam splitter is projected by an objective lens 69 onto a magneto-optical record disk 70 as a fine spot.

A return laser beam 68 reflected by the magneto-optical record disk 70 is made incident upon the glass prism 74 by means of the objective lens 69. A part of the return laser beam 68 transmitted through the cementing plane 73 of the beam splitter is made incident upon an incident surface 80 of the polarizing beam splitter 75. Then, the return laser beam is divided into ordinary and extraordinary light beams 71 and 72, and these light beams are reflected by a reflection surface 78 on which a gold film 79 is applied. The ordinary light beam 71 and extraordinary light beam 72 are reflected by the reflection surface 78 as ordinary light beam 76 and extraordinary light beam 77. These ordinary and extraordinary light beams 76 and 77 emanate from an exit surface 81 of the polarizing beam splitter 75, and are then made incident upon photodiodes (PD) 65 and 66, respectively. By processing output signals from these PDs 65 and 66, it is possible to derive information signal and error signals for servo control.

In the present embodiment, LD 61 is positioned on a stem 63 via a sub-mount 62 and PDs 65 and 66 are formed on a common silicon substrate 64 which is positioned on the stem 63. In this manner, LD 61 and PDs 65, 66 are formed as a single integral body. The cementing plane 73 of the beam splitter is formed by a multiple coating of plural dielectric material films such that a transmissivity for S polarized light is 30%, a reflectance for S polarized light is 70%, and a transmissivity for P polarized light is 100%.

Therefore, in the present embodiment 70% of the laser light 67 emitted by the LD 61 is reflected by the cementing plane 73 of the beam splitter toward the magneto-optical record disk 70. The return laser beam 68 reflected by the magneto-optical record disk 70 has been subjected to the Kerr effect and its polarizing direction has been rotated, so that the return laser beam contains a P polarized component. This P polarized component is completely transmitted through the cementing plane 73. 30% of S polarized component in the return laser beam 68 is transmitted through the cementing plane 73.

The ordinary and extraordinary light beams 76 and 77 emanating from the exit surface 81 of the polarizing beam splitter 75 are converging light beams, and are subjected to astigmatism due to refraction at the incident surface 80 and exit surface 81 of the polarizing beam splitter 75. Therefore, by constructing one of the PDs 65 and 66 to have four divided light receiving regions, a focusing error signal may be derived by the astigmatism method and a tracking error signal may be obtained by the push-pull method. The information signal may be derived as a difference between the output signals from the PD 65 and the PD 66.

In the present embodiment, the polarizing beam splitting operation for obtaining the information signal can be performed by the single polarizing beam, and the astigmatism for deriving the focusing error signal can be generated without providing an additional optical element introducing astigmatism. Therefore, it is possible to realize the optical pick-up composed of a smaller number of parts for the magneto-optical record medium.

Figure 10:
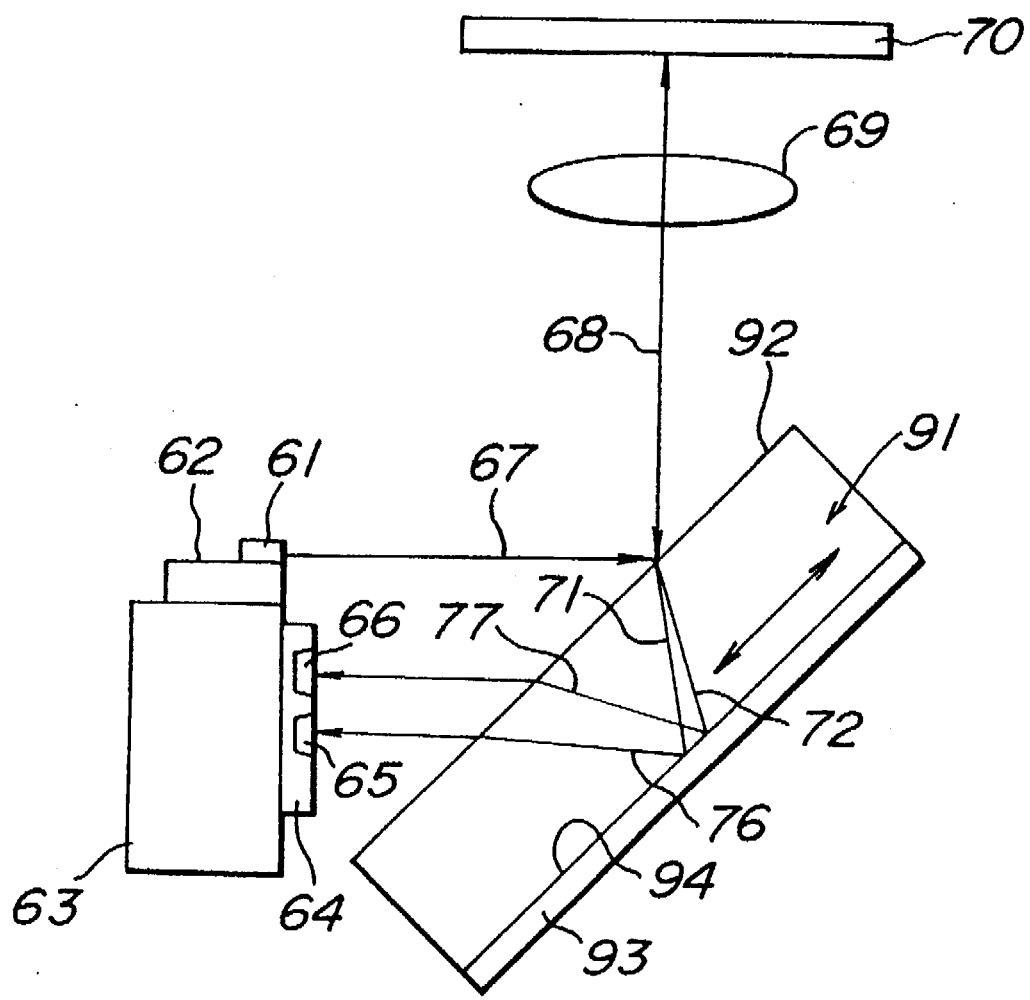
FIG. 10 is a schematic view showing a second embodiment of the optical pick-up head according to the invention including a fifth embodiment of the polarizing beam splitter according to the invention.

FIG. 10 is a schematic view showing a second embodiment of the optical pick-up head including a fifth embodiment of the polarizing beam splitter according to the invention. In the present embodiment, a polarizing beam splitter 91 has the same construction as that of the second embodiment and serves as the beam splitter 74 of the previous embodiment shown in FIG. 9. On an incident surface 92 of the polarizing beam splitter 91, there is applied a stack of dielectric material films having a such property that a transmissivity for S polarized light is 30%, a reflectance for S polarized light is 70%, and a transmissivity for P polarized light is 100%.

In the present embodiment, 70% of S polarized component of a laser light beam 67 emitted by a LD 61 is reflected by the incident surface 92 of the polarizing beam splitter 91 toward a magneto-optical record disk 70 by means of an objective lens 69. A return laser beam 68 reflected by the magneto-optical record disk 70 is made incident upon the incident surface 92 of the polarizing beam splitter 91. P polarized component contained in the return laser beam 68 is completely transmitted through the incident surface 92. 30% of S polarized component in the return laser beam 68 is transmitted through the incident surface 92.

Ordinary and extraordinary light beams 76 and 77 emanating from the surface 92 of the polarizing beam splitter 91 are converging light beams, and are subjected to astigmatism due to refraction at the surface 92 and exit surface 81 of the polarizing beam splitter 75. Therefore, by constructing one of the PDs 65 and 66 to have four divided light receiving regions, a focusing error signal may be derived by the astigmatism method and a tracking error signal may be obtained by the push-pull method. The information signal may be derived as a difference between the output signals from the PD 65 and the PD 66.

Also in the present embodiment, the polarizing beam splitting operation for obtaining the information signal, the astigmatism generating function for deriving the focusing error signal, and the beam splitting function for separating the incident light beam and return light beam from each other can be performed by the single polarizing beam splitter 91, so that the number of parts and a cost of the optical pick-up for the magneto-optical record medium can be reduced.

FIG. 11 is a schematic view showing a third embodiment of the optical pick-up head comprising a sixth embodiment of the polarizing beam splitter according to the invention. In the present embodiment, use is made of a polarizing beam splitter 95 having a similar construction as that of the third embodiment illustrated in FIG. 8. On a surface 97 of a plane parallel plate 96 of the polarizing beam splitter 95, there is provided a stack of dielectric material films having such a property that a transmissivity for S polarized light is 30%, a reflectance for S polarized light is 70%, and a transmissivity for P polarized light is 100%.

A laser light beam 67 emitted by a LD 61 is transmitted through a glass prism 98 of the polarizing beam splitter 95 and is made incident upon the surface 97 of the plane parallel plate 96 having a multiple coating of dielectric material films. 70% of S polarized light of the laser light beam 67 is reflected by the surface 97 of the plane parallel plate 96 of the polarizing beam splitter 95 toward a magneto-optical record disk 70 by means of an objective lens 69. A return laser beam 68 reflected by the magneto-optical record disk 70 is made incident upon the surface 97 of the plane parallel plate 96 by means of the objective lens 69 and glass prism 98. P polarized component contained in the return laser beam 68 is completely transmitted through the surface 97. 30% of S polarized component in the return laser beam 68 is transmitted through the surface 97. The return laser beam is transmitted through the surface 97 and is divided into ordinary light beam 71 and extraordinary light beam 72. Then, these light beams 71 and 72 are reflected by a reflection surface 100 of the plane parallel plate 96. On the reflection surface 100 of the plane parallel plate 96, there is applied a gold film 99. Therefore, the ordinary and extraordinary light beams 71 and 72 are reflected by the reflection surface 100 as ordinary and extraordinary light beams 76 and 77, respectively.

The ordinary and extraordinary light beams 76 and 77 emanating from the polarizing beam splitter 95 are converging light beams, and are subjected to astigmatism due to refraction at the surface 92 and exit surface 81 of the polarizing beam splitter 75. Therefore, like as the fourth and fifth embodiments, by constructing one of the PDs 65 and 66 to have four divided light receiving regions, a focusing error signal may be derived by the astigmatism method and a tracking error signal may be obtained by the push-pull method. The information signal may be derived as a difference between the output signals from the PD 65 and the PD 66.

Similar to the first embodiment of the optical pick-up head, in the present embodiment, the polarizing beam splitting operation for obtaining the information signal, the astigmatism generating function for deriving the focusing error signal, and the beam splitting function for separating the incident light beam and return light beam from each other can be performed by the single polarizing beam splitter 95. Therefore, a number of parts of the optical pick-up for the magneto-optical record medium can be reduced and the optical pick-up can be made small in size and cheap in cost.

In the present embodiment, the dielectric material films are inserted between the glass prism 98 having an index of refraction of 1.52 and the main body 96 made of LN crystal having an index of refraction of 2.2–2.3, and a difference in these indices of refraction is rather small. Therefore, the multiple coating may be formed by stacking generally used $SiO_2$ films and $TiO_2$ films alternately. Then, the a loss of light can be reduced as compared with the fifth embodiment in which the multiple film coating is formed on the surface between the main body and the air, so that the signals can be detected at a higher sensitivity.

FIG. 12 is a schematic view showing a fourth embodiment of the optical pick-up head including a seventh embodiment of the polarizing beam splitter according to the invention. Also in this embodiment, an optical pick-up for the magneto-optical record medium is formed by a polarizing beam splitter 105 like as the third embodiment. In the present embodiment, a thickness of a main body 96 of the polarizing beam splitter 105 is increased such that ordinary and extraordinary light beams reflected by a reflection surface 100 of the main body 96 emanate from an exit surface 106 of the main body 96 of the polarizing beam splitter 105 without being transmitted through a glass prism 98. The ordinary and extraordinary light beams 76 and 77 are made incident upon photodiodes 65 and 66, respectively.

A polarizing direction of the return light beam 68 impinging upon the main body 96 of the polarizing beam splitter 105 is different from polarizing directions of the ordinary and extraordinary light beams 76 and 77 reflected by the reflection surface 100. Therefore, it is preferable that the polarizing film provided on the surface 97 of the main body 96 has different properties on its incidence side and its exit side. However, when this is applied to the third embodiment in which the incidence surface and exit surface are provided on the same plane, it is necessary to make the coating property different by means of a complicated step using a fine mask in a photolithography. It is also possible to use the coating having a single property, but in this case a loss of light, i.e. quality of signals is somewhat deteriorated.

In the present embodiment, in order to remove the above mentioned drawback, the incident surface 97 of the main body upon which the return light beam 68 is made incident and the surface 106 from which the divided ordinary and extraordinary light beams 76 and 77 emanate are provided separately from each other. Then, the multiple coating of dielectric material films may be formed on the incident surface having such a property that a transmissivity for S polarized light is 30%, a reflectance for S polarized light is 70%, and a transmissivity for P polarized light is 100%, and an anti-reflection coating may be applied on the exit surface 106. In this manner, in the present embodiment, it is possible to provide the coatings having desired properties on the incidence surface 97 and exit surface 106.

The present invention is not limited to the above explained embodiments, but may be modified or changed in various ways. For instance, the gold film constituting the reflecting member may be replaced by silver film or aluminum film. The reflecting member may be formed by a multiple coating of dielectric materials.

What is claimed is:

1. A polarizing beam splitter comprising:
    a main body which is formed by a plane parallel plate, is made of a birefringent material and has an incident surface upon which an incident light beam is made incident and by which the incident light beam is refracted and a reflection surface which reflects the incident light beam transmitted through said incident surface, an optic axis of the birefringent material being on a plane which is parallel with said reflection surface;
    a reflecting member provided on said reflection surface of the main body and being made of dielectric materials; and
    an anti-reflecting member applied on the incident surface of said main body and formed by a stack of a plurality of dielectric material films.

2. A polarizing beam splitter comprising:
    a main body which is formed by a plane parallel plate, is made of a birefringent material and has an incident surface upon which an incident light beam is made incident and by which the incident light beam is refracted and a reflection surface which reflects the incident light beam transmitted through said incident surface, an optic axis of the birefringent material being on a plane which is parallel with said reflection surface;
    a reflecting member provided on said reflection surface of the main body and being made of dielectric materials; and
    a polarizing beam splitting member applied on the incident surface of said main body and formed by a stack of a plurality of dielectric material films.

3. A polarizing beam splitter comprising:
    a main body which is formed by a plane parallel plate, is made of a birefringent material and has an incident surface upon which an incident light beam is made incident and by which the incident light beam is refracted and a reflection surface which reflects the incident light beam transmitted through said incident surface, an optic axis of the birefringent material being on a plane which is parallel with said reflection surface;
    a reflecting member provided on said reflection surface of the main body and being made of dielectric materials; and
    a prism made of an optical material having an index of refraction lower than an index of refraction of the main body, said prism being cemented onto the incident surface of said main body.

4. A polarizing beam splitter according to claim 3, wherein said main body is made of $LiNbO_3$ and said prism is made of a glass.

5. An optical pick-up head for recording and/or reading information on and/or from a record medium, said head comprising:
    a light source for emitting a linearly polarized light beam;
    an objective lens for projecting said light beam onto the record medium;
    a photodetector for receiving a return light beam reflected by the record medium and converged by said objective lens; and
    a polarizing beam splitter arranged between said objective lens and said photodetector and including a main body made of a birefringent material and having an incident surface upon which the return light beam is made incident and by which the return light beam is made incident and by which the return light beam is refracted and a reflection surface which reflects the return light beam transmitted through said incident surface, an optic axis of the birefringent material being on a plane which is parallel with said reflection surface, and a reflecting member provided on said reflection surface of the main body and being made of dielectric materials.

6. An optical pick-up head according to claim 5, wherein said main body of the polarizing beam splitter is formed by a triangular prism.

7. An optical pick-up head according to claim 5, wherein said main body of the polarizing beam splitter is formed by a plane parallel plate.

8. An optical pick-up head according to claim 7, further comprising a anti-reflecting member applied on said incident surface of said main body and formed by a stack of a plurality of dielectric material films.

9. An optical pick-up head according to claim 7, further comprising a polarizing beam splitting member applied on said incident surface of said main body and formed by a stack of a plurality of dielectric material films.

10. An optical pick-up head according to claim 7, wherein said polarizing beam splitter further comprises a prism made of an optical material having an index of refraction lower than an index of refraction of the main body, said prism being cemented onto the incident surface.

11. An optical pick-up head according to claim 10, wherein said main body of the polarizing beam splitter is made of $LiNbO_3$ and said prism is made of a glass.

12. An optical pick-up head according to claim 5, wherein the birefringent material is a birefringent crystal.

13. An optical pick-up head according to claim 12, wherein the birefringent crystal comprises $LiNbO_3$.

14. An optical pick-up head according to claim 5, wherein the optic axis of the birefringent material forms an angle of 45° with a plane of incidence of return light beam on the incident surface.

* * * * *